(12) United States Patent
Neff et al.

(10) Patent No.: US 10,212,359 B2
(45) Date of Patent: Feb. 19, 2019

(54) CAMERA NORMALIZATION

(71) Applicant: Cerner Innovation, Inc., Kansas City, KS (US)

(72) Inventors: Robert A. Neff, Villanova, PA (US); Madelyn McGillin, Wayne, PA (US)

(73) Assignee: Cerner Innovation, Inc., Kansas City, KS (US)

( * ) Notice: Subject to any disclaimer, the term of this patent is extended or adjusted under 35 U.S.C. 154(b) by 0 days.

(21) Appl. No.: 14/984,200

(22) Filed: Dec. 30, 2015

(65) Prior Publication Data

US 2017/0195578 A1   Jul. 6, 2017

(51) Int. Cl.
*H04N 5/243* (2006.01)
*H04N 5/232* (2006.01)
*G06K 9/62* (2006.01)
*G06K 5/00* (2006.01)
*G06K 9/46* (2006.01)
*G06T 5/00* (2006.01)

(52) U.S. Cl.
CPC ........... *H04N 5/243* (2013.01); *G06K 9/4661* (2013.01); *G06K 9/6215* (2013.01); *G06T 5/00* (2013.01); *H04N 5/23222* (2013.01); *H04N 5/23229* (2013.01)

(58) Field of Classification Search
CPC ................ H04N 5/23225; H04N 5/23222
USPC ... 348/333.04, 333.12, 222.1, 229.1, 333.01, 348/333.11
See application file for complete search history.

(56) References Cited

U.S. PATENT DOCUMENTS

| | | | |
|---|---|---|---|
| 7,162,063 B1* | 1/2007 | Craine | G06T 7/0012 |
| | | | 128/922 |
| 2005/0152615 A1* | 7/2005 | Hutchinson | G06T 5/009 |
| | | | 382/274 |
| 2007/0002157 A1* | 1/2007 | Shintani | H04N 5/23293 |
| | | | 348/333.06 |
| 2007/0236567 A1* | 10/2007 | Pillman | H04N 5/23212 |
| | | | 348/143 |
| 2008/0118138 A1* | 5/2008 | Zingaretti | G06T 7/0012 |
| | | | 382/132 |
| 2009/0043363 A1* | 2/2009 | Cotton | A61B 5/442 |
| | | | 607/88 |
| 2010/0007665 A1* | 1/2010 | Smith | G06T 13/40 |
| | | | 345/473 |
| 2010/0302393 A1* | 12/2010 | Olsson | G06K 9/00228 |
| | | | 348/222.1 |
| 2011/0254976 A1* | 10/2011 | Garten | G06F 3/1454 |
| | | | 348/229.1 |
| 2012/0106795 A1* | 5/2012 | Farrer | G06K 9/00221 |
| | | | 382/103 |
| 2012/0117471 A1* | 5/2012 | Amidon | H04N 5/76 |
| | | | 715/716 |
| 2012/0289203 A1* | 11/2012 | Santo | H04M 19/048 |
| | | | 455/412.2 |
| 2013/0176400 A1* | 7/2013 | Jang | G06T 5/009 |
| | | | 348/47 |

(Continued)

*Primary Examiner* — Xi Wang
(74) *Attorney, Agent, or Firm* — Shook, Hardy & Bacon L.L.P.

(57) ABSTRACT

Methods, systems, and computer-readable media are provided for camera normalization. Images may be normalized after they are captured to conform to previously captured images. Images may also be preemptively adjusted (prior to capture) to conform to previously captured images.

13 Claims, 4 Drawing Sheets

(56) References Cited

U.S. PATENT DOCUMENTS

| | | | |
|---|---|---|---|
| 2013/0223763 A1* | 8/2013 | Lin | G06K 9/6204 382/294 |
| 2014/0247985 A1* | 9/2014 | Park | G06T 5/40 382/170 |
| 2015/0318019 A1* | 11/2015 | Singhal | G11B 27/031 386/282 |

* cited by examiner

CAMERA NORMALIZATION

BACKGROUND

Using images in healthcare has been commonplace for years. Often healthcare imaging focuses on taking patient/person pictures or visualizing internal organs, but there are just as many cases where taking photos from the outside of the body are necessary. These types of photos focus on cases of documenting skin conditions including pressure ulcers which may be visible from outside the body. In pressure ulcer care, images are taken and reviewed over time to see how a wound is healing or worsening and guide treatment. The challenge in many of these cases is that a regular camera is used for capturing the images. As tablets and other mobile devices are integrating cameras and becoming more common in devices to capture these photos, the differences between the optics and electronics in these devices must be considered. An image captured on a mobile phone, for instance, may look different (in color, contrast, brightness, etc.) from an image captured on a different device. It can be risky to assess and compare the coloration of a wound across images when the image capturing device is not constant with respect to how it records/captures that color. Healthcare organizations may be at risk for failure to detect conditions using these photos.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In brief and at a high level, this disclosure describes, among other things, methods, systems, and computer storage media for camera normalization. Visible light images (i.e., those that are visible to the naked eye) are commonplace in healthcare. Typical uses may be for wounds, rashes, skin markings (e.g., moles), and the like. Visible light images are oftentimes images that are used over a period of time and, as such, are compared to one another to monitor a subject. As previously mentioned, multiple image capture devices (e.g., cameras) may be utilized throughout a course of treatment for a patient. Different image capture devices may have different properties associated therewith (e.g., zoom settings, lenses, etc.). Additionally, environmental factors (e.g., lighting) may differ between each image of a series of images. These differences should be addressed either after or before subsequent images are captured.

In a post-capture situation (i.e., the subsequent image has already been captured), normalization may be performed on the subsequent image so that it conforms to previous images. In a pre-capture situation (i.e., the subsequent image has not yet been captured), a user may be notified of one or more adjustments that may be made to make the subsequent image conform to previous images.

BRIEF DESCRIPTION OF THE DRAWINGS

Embodiments are described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In brief and at a high level, this disclosure describes, among other things, methods, systems, and computer storage media for camera normalization. Visible light images (i.e., those that are visible to the naked eye) are commonplace in healthcare. Typical uses may be for wounds, rashes, skin markings (e.g., moles), and the like. Visible light images are oftentimes images that are used over a period of time and, as such, are compared to one another to monitor a subject. As previously mentioned, multiple image capture devices (e.g., cameras) may be utilized throughout a course of treatment for a patient. Different image capture devices may have different properties associated therewith (e.g., zoom settings, lenses, etc.). Additionally, environmental factors (e.g., lighting) may differ between each image of a series of images. These differences should be addressed either after or before subsequent images are captured. The images described herein may refer to "still" images or images captured from a video. Alternatively, the present invention may be applied to videos as well.

The claimed solution is necessarily rooted in computerized healthcare technology in order to overcome a problem specifically arising in the realm of computer healthcare information networks, and the claims address the problem of conforming a series of digital images to previous images. If adhering to the routine, conventional function of providing a series of images, the images may be non-conforming and differ in ways that alter display of the image. Conformance of images is critical in diagnosis or treatment of image subjects. The claimed invention overcomes the limitations of current computer healthcare technology and provides other benefits that will become clear to those skilled in the art from the foregoing description.

Figure 1:
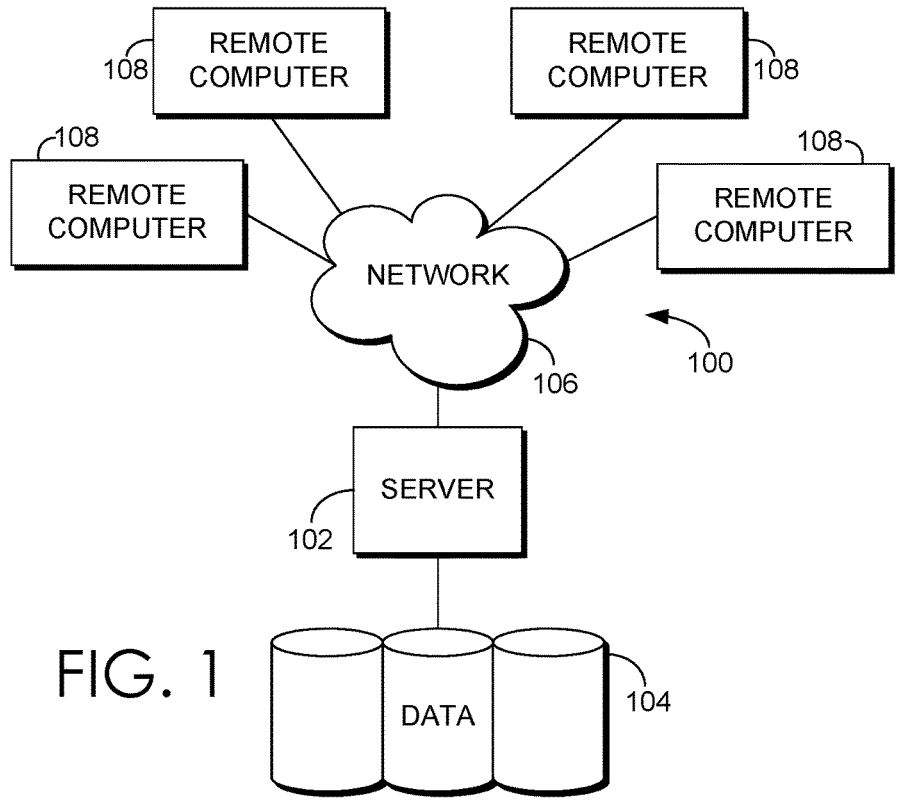
FIG. 1 is a block diagram of an exemplary computing environment suitable to implement embodiments of the present invention.

An exemplary computing environment suitable for use in implementing embodiments of the present invention is described below. FIG. 1 is an exemplary computing environment (e.g., medical-information computing-system environment) with which embodiments of the present invention may be implemented. The computing environment is illustrated and designated generally as reference numeral 100. The computing environment 100 is merely an example of one suitable computing environment and is not intended to suggest any limitation as to the scope of use or functionality of the invention. Neither should the computing environment 100 be interpreted as having any dependency or requirement relating to any single component or combination of components illustrated therein.

The present invention is a special computing system that can leverage well-known computing system environments or configurations. Examples of well-known computing systems, environments, and/or configurations that might be suitable for use with the present invention include personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention might be described in the general context of computer-executable instructions, such as program modules, being executed by a computer. Exemplary program modules comprise routines, programs, objects, components, and data structures that perform particular tasks or implement particular abstract data types. The present invention might be practiced in distributed computing environments where tasks are performed by remote processing devices that are linked through a communications network. In a distributed computing environment, program modules might be located in association with local and/or remote computer storage media (e.g., memory storage devices).

With continued reference to FIG. 1, the computing environment 100 comprises a computing device in the form of a control server 102. Exemplary components of the control server 102 comprise a processing unit, internal system memory, and a suitable system bus for coupling various system components, including data store 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 102 typically includes therein, or has access to, a variety of non-transitory computer-readable media. Computer-readable media can be any available media that might be accessed by control server 102, and includes volatile and nonvolatile media, as well as, removable and nonremovable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by control server 102. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and clinicians' offices. Clinicians may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like. The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networking environment, program modules or portions thereof might be stored in association with the control server 102, the data store 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a microphone (e.g., voice inputs), a touch screen, a pointing device (commonly referred to as a mouse), a trackball, or a touch pad. Other input devices comprise satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

Although many other internal components of the control server 102 and the remote computers 108 are not shown, such components and their interconnection are well known. Accordingly, additional details concerning the internal construction of the control server 102 and the remote computers 108 are not further disclosed herein.

Figure 2:
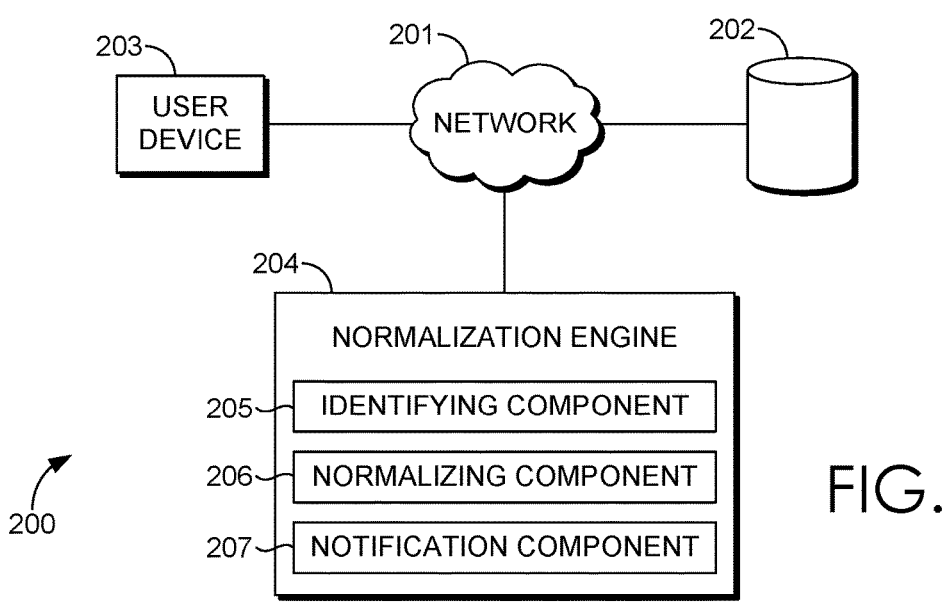
FIG. 2 is a block diagram of an exemplary system for camera normalization suitable to implement embodiments of the present invention.

Turning now to FIG. 2, a block diagram 200 is illustrated, in accordance with an embodiment of the present invention, showing an exemplary system for camera normalization. It will be understood and appreciated that the computing system shown in FIG. 2 is merely an example of one suitable computing system environment and is not intended to suggest any limitation as to the scope of the user or functionality of embodiments of the present invention. Neither should the computing system be interpreted as having any dependency or requirement related to any single component or combination of components illustrated therein. Further, although the various block of FIG. 2 are shown with lines for the sake of clarity, in reality, delineating various components is not so clear, and metaphorically, the lines would more accurately be grey and fuzzy. In addition, any number of physical machines (such as computing devices or portions of computing devices shown in FIG. 1), virtual machines, data centers, endpoints, or combinations thereof may be employed to achieve the desired functionality within the scope of embodiments of the present invention.

The components of FIG. 2 are capable of communicating with a number of different entities or data sources such as database 202 for the collection of data. This communication may utilize, without limitation, one or more local area networks (LANs) and/or wide area networks (WANs). Such networking environments are commonplace in offices, enterprise-wide computer networks, intranets, and the Internet. Accordingly, the network 201 is not further described herein. As used throughout this application, the term "healthcare data" is meant to be broad and encompass any type of healthcare information. The healthcare data may be specific to a single patient or a group of patients. The healthcare data may also be directed to a clinician or group of clinicians. For example, healthcare data as it relates to a clinician may include patients that the clinician treats.

Returning now to FIG. 2, the exemplary system 200 includes a database 202, a user device 203, and a normalization engine 204. The database 202 may be any data store capable of storing data relevant to images. The database 202 may include a conversion table of known image capture devices with all properties associated therewith. The conversion table may include adjustments for images captured by various devices to conform to images captured by other devices.

The user device 203 represents any user devices used to capture or display images. Exemplary user devices include cameras, workstations, laptops, tablets, mobile phones, etc. The user device 203 may be any device that includes a camera.

The normalization engine 204 may be any device configured for camera normalization. The camera normalization includes normalizing images post-capture, normalizing images pre-capture, normalization of cameras, and the like. The normalization engine comprises an identifying component 205, a normalizing component 206, and a notification component 207.

The identifying component 205 may be configured for, among other things, identifying properties of images and differences between properties of sequential images. The identifying component 205 may identify differences in sequential images after the images are captured. The identifying component 205 may identify differences in sequential images prior to capturing the sequential image. This may occur when an image capture device is ready to capture a sequential image (e.g., an indication that a sequential image is about to be captured is received) but the image has not yet been captured. An indication that a sequential image is about to be captured may be an input into a patient's electronic health record (EHR) that a sequential image is to be captured and input in the EHR or the like.

The properties may be identified by the identifying component 205 from within metadata associated with each image (in the post-capture embodiment). Each image may be associated with metadata including a device identifier of the image capture device that captured the image, a time stamp of the image, and the like. In embodiments, specific properties of the device are included in the metadata. In other embodiments, properties of the device are automatically looked up (e.g., by the computing system) in a device conversion table or on-line based on a type of device capturing the image. Additional data that may be included with each image is related to a patient position during the image capture (e.g., patient was sitting/standing/lying down, etc.). In some embodiments, patient physiological data may also be automatically associated with an image such as temperature, blood pressure, pulse, edema, etc. For example, the system may receive patient physiological data (e.g., from patient monitoring equipment, from input in a patient's electronic health record, etc.) and automatically link the physiological data with relevant images.

Images may also be automatically tagged with details on location and weather conditions for which the image was captured. The system may be configured to automatically receive or retrieve information such as weather and a location (e.g., from a GPS) and tag an image with the information. For example, on a sunny day (as evidenced by data gathered automatically by the system from a weather report and a GPS location of a camera when the image was taken) a note may be made and tagged on the image to be aware that the image may be washed out. Similarly, a stormy or cloudy day will also affect brightness of an image. This may not be relevant in all cases (e.g., environment where there are no windows).

Environmental details may also be provided such as lighting in a room. A link from building management systems may be fed to the system 200 to link this data with data tagged on images. Lighting detail information, for example, may be linked based on the location of the image when the image was captured and lighting information for that location. Additional links may allow a camera to adjust the lighting through a building management system to change the lighting to match expected or standard lighting conditions or, alternatively, to match lighting conditions of other images previously captured for the patient.

The normalizing component 206 may be configured for, among other things, normalizing images, camera, and the like. As mentioned, the normalization may take the form of normalizing images after they are captured. The normalization may also be preemptive in the form of identifying preemptive measures to take prior to capturing an image to make sure it conforms to previously captured images.

The notification component 207 may be configured for, among other things, providing notifications indicating a series of images do not conform to each other, one or more adjustments to be made to make images conform to one another, and the like. The notifications may be prompted prior to an image capture, during a comparison of images, and the like. The notifications may include adjustments to make to ensure the images conform to one another. Alternatively, the notification may only indicate that two photos do not conform to one another and should not be used for clinical comparisons.

In application, one or more image capture devices are used for capturing visible light images (i.e., visible to the naked eye in contrast to X-rays, MRI's, and the like). A single facility (e.g., a hospital) may have several different image capture devices within the facility. Differences between those devices, and the images captured thereon, should be addressed. For instance, exemplary properties that may differ among sequential images (captured on different or the same devices) include lighting, sizing, zoom, etc. The normalization discussed herein applies to both post-capture and pre-capture scenarios where the system automatically identifies non-conforming properties without human input or intervention. Thus, the system automatically compares properties of images when selected to compare (post-capture) and automatically compares properties of existing images with an image to be captured (pre-capture) to ensure as many images conform to one another for comparison as possible.

Figure 3:
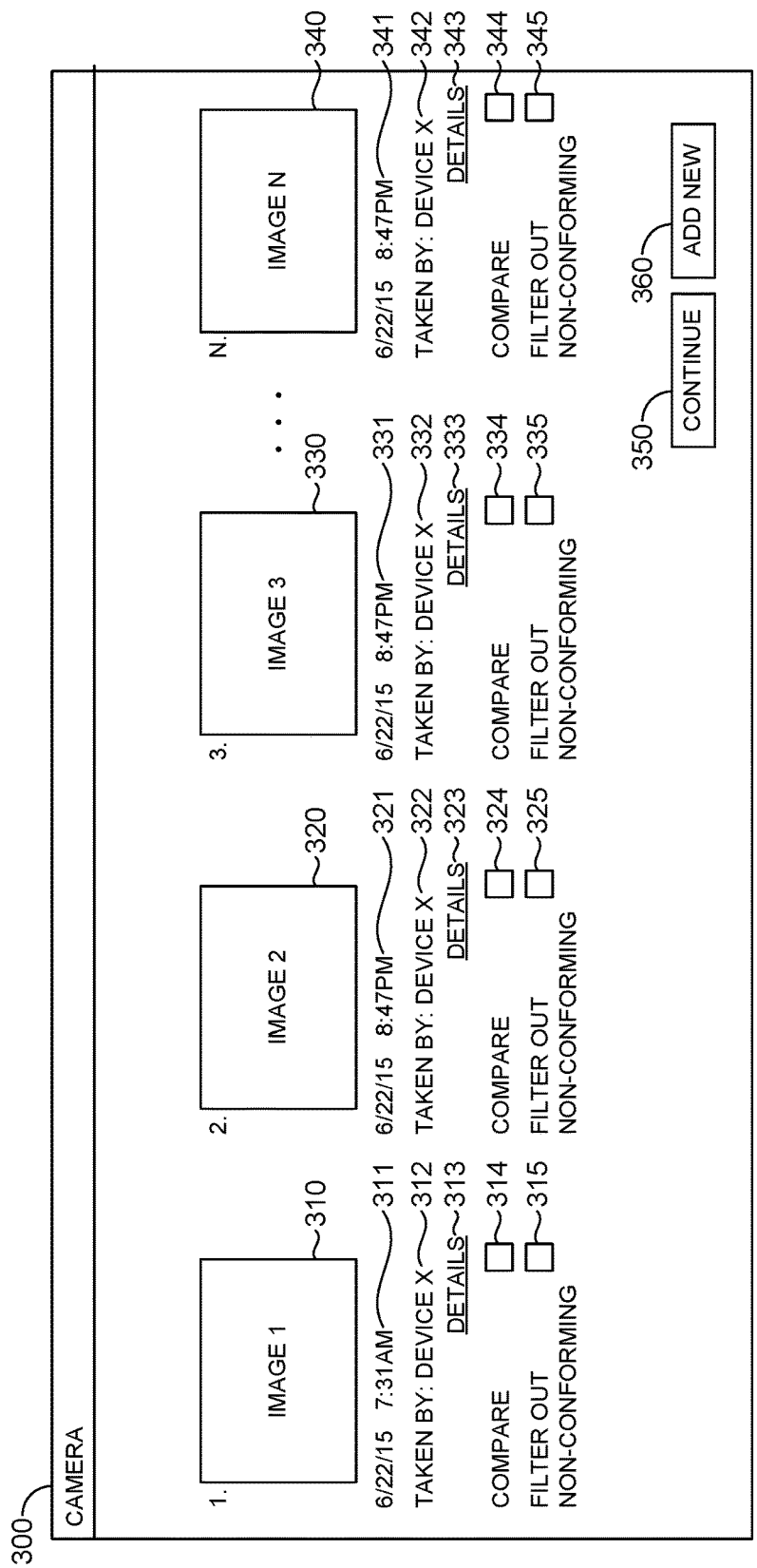
FIG. 3 is an exemplary image interface in accordance with an embodiment of the present invention.

FIG. 3 provides an exemplary interface 300 for a post-capture scenario. As provided in FIG. 3, a plurality of images (image 310, image 320, image 330, and image 340) is provided. The images may be a thumbnail view. As shown, each image may be associated with data that may be displayed within the interface 300. Image 310 is associated, for instance, with a time stamp 311, a device identifier 312, and device details indicator 313. The time stamp 311 indicates a time the image 310 was captured (e.g., date and time). The device identifier 312 indicates an image capture device that captured the image 310. The device details indicator 313, upon selection thereof, provides additional details related to the device indicated by the device identifier 312. For example, lens information, among other things, may be provided in the detailed section. In an alternative embodiment, the details may be listed directly in the interface 300. As is shown in the interface 300, each of the other images is also associated with the same indicators. Image 320 is associated with a time stamp 321, a device identifier 322, and a device details indicator 323. Image 330 is associated with a time stamp 331, a device identifier 332, and a device details indicator 333. Image 340 is associated with a time stamp 341, a device identifier 342, and a device details indicator 343. In embodiments, properties that differ (e.g., device identifiers that are different) may be highlighted to draw a user's attention to differing properties. In additional embodiments, images captured on the same device are highlighted in the same color to easily identify images that can be easily compared.

Each image is also associated with a compare indicator (i.e., compare indicators 314, 324, 334, and 344). The compare indicators, when selected, indicate which images are to be compared to one another. In an embodiment, the differing properties are not highlighted until selection of at least two compare indicators is identified. This may be because until a user has decided to compare images, it may not be necessary to highlight differences between images.

Each image is also associated with a filter out indicator (i.e., filter out indicators 315, 325, 335, and 345). The filter out indicators, when selected, indicate that any images that are non-conforming to the selected images should be filtered out. Alternatively, the images that are non-conforming may be highlighted. A continue indicator 350 is provided for a user to continue with a comparison or a filter instruction, depending on the selections made in interface 350. Finally, an add new indicator 360 is provided in FIG. 3 for selection when a user would like to add a new image to the series.

Figure 4:
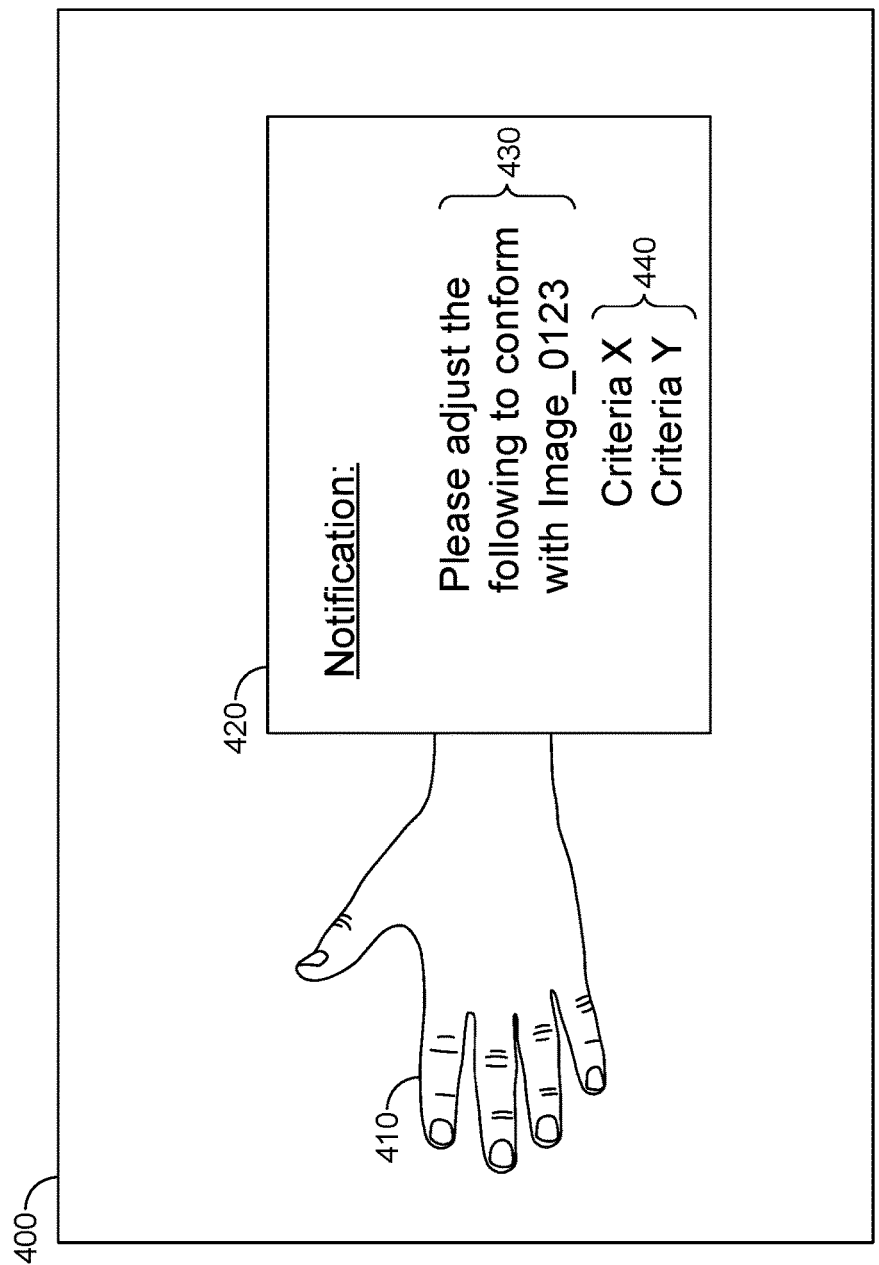
FIG. 4 is an exemplary adjustment interface in accordance with an embodiment of the present invention.

FIG. 4 provides an exemplary interface 400 for a pre-capture scenario. FIG. 4 provides an image subject 410 (in this case a patient's arm/hand) and a notification 420. In this displayed scenario, an image is about to be taken with an image capture device. The image and notification may be presented on the image capture device itself or on a separate device (e.g., an image capture device is positioned above the subject area while an image is presented on a separate computer for viewing by a user). The notification 420 may include a warning 430 that adjustments should be made to conform to a given image. The indication of a previous image may be indicated by a user or may be identified by the system 200 from the patient's EHR. For example, the system 200 may identify previous images for a patient when a new image is to be added. The notification 420 may also include one or more adjustments 440 to make to an image to conform to a previous image (the identified previous image in the warning 430, for instance). The adjustments may include zooming in, zooming out, adjusting the lighting in the room/environment, and the like.

In embodiments, thermal imaging sensors are leveraged to detect and overlay temperature data on an image. This thermal imaging information is valuable in the treatment of wounds, for example, where blood cells rush to the area during healing (resulting in warmer temperatures). Thermal sensors may assist in monitoring healing of wounds. By overlaying the temperature data over images, comparisons may be easily made and a stage of healing identified.

Additional embodiments include overlaying depth and other spatial measurement data over images during image acquisition to allow the image acquirer (e.g., the device capturing the photo) to match a previously captured image to said new image currently being captured to allow for better future comparison. Overlaying a scale on the viewfinder while capturing a new image will allow a new image to be taken at substantially the same angle and distance as previous images. Notifications may be provided guiding a user through matching up the scales. For example, a notification indicating a user was 3 inches closer in the previous image may be provided.

Figures 5, 6:
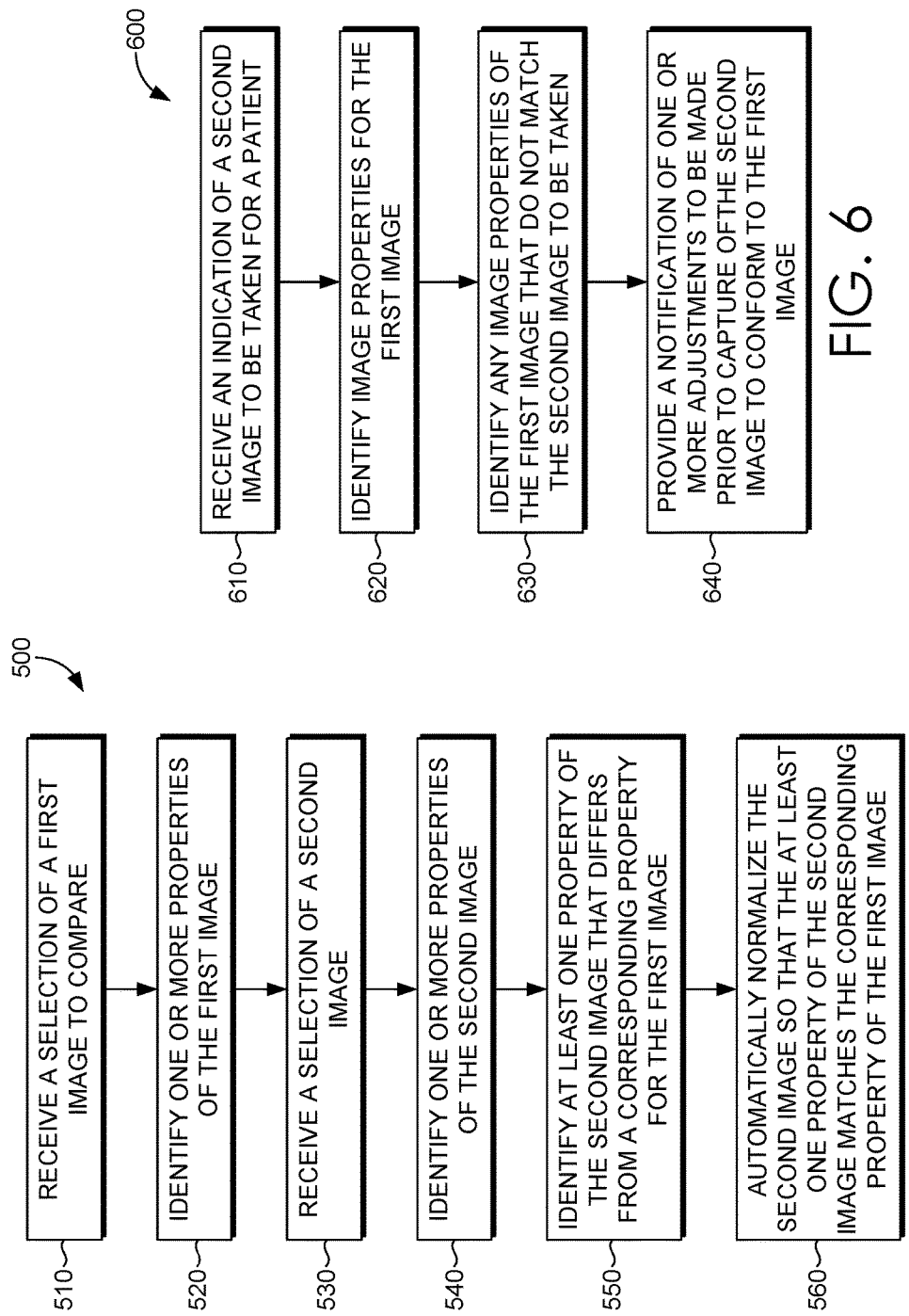
FIG. 5 is a flow diagram of an exemplary method of normalizing images in accordance with an embodiment of the present invention.
FIG. 6 is a flow diagram of an exemplary method of normalizing images in accordance with an embodiment of the present invention.

Turning now to FIG. 5, a flow diagram illustrating an exemplary method 500 is provided. Initially, at block 510, a selection of a first image to compare is received. One or more properties of the first image are identified at block 520. A selection of a second image to compare to the first image is received at block 530 and one or more properties of the second image are identified at block 540. At least one property of the second image that differs from a corresponding property of the first image is identified at block 550. At block 560, the second image is automatically normalized so that the at least one property of the second image matches the corresponding property of the first image.

Turning now to FIG. 6, a flow diagram illustrating an exemplary method 600 is provided. Initially, at block 610, an indication of a second image to be taken for a patient is received. One or more properties of the first image are identified at block 620. At block 630, a first property of the one or more properties of the first image that does not match a corresponding second property of the second image to be taken is identified. At block 640, a notification of one or more adjustments to make prior to capture of the second image to make the second image conform to the first image is provided.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. A system for normalization, the system comprising:
one or more processors of a normalization engine; and
one or more computer storage media storing computer-executable instructions that, when executed by the one or more processors of the normalization engine, implement a method comprising:
receiving a selection of a first image to compare, wherein the first image was captured in a first environment;
identifying a first set of properties of the first image, wherein at least a first property of the first set of properties is associated with a first camera device, and wherein a second property of the first set of properties is associated with the first environment;
receiving a selection of a second image to compare to the first image wherein the second image was captured in a second environment;
identifying a second set of properties of the second image, wherein at least a first property of the second set of properties is associated with a second camera device wherein a second property of the second set of properties is associated with the second environment, and wherein the second environment is different from the first environment;
identifying at least one property of the second image that differs from a corresponding property of the first image; and
automatically normalizing the second image so that the at least one property of the second image matches the corresponding property of the first image, wherein the second image is normalized using a conversion table comprising properties of the first camera device, the second camera device, the first environment and the second environment.

2. The system of claim 1, wherein the first property of the first image includes the first camera device that captured the first image and camera settings of the first camera device while capturing the first image.

3. The system of claim 2, wherein the second property of the first image further includes a lighting descriptor of the first environment where the first image was captured.

4. The system of claim 1, wherein the first property of the second image includes the second camera device that captured the second image and camera settings of the second camera device while capturing the second image.

5. The system of claim 4, wherein the second property of the second image further includes a lighting descriptor of the second environment where the second image was captured.

6. The system of claim 1, wherein the at least one property of the second image that differs from the corresponding property of the first image is a lighting property.

7. The system of claim 6, wherein the second image is normalized by adjusting a brightness of the second image.

8. A computerized method carried out by a normalization engine having at least one processor for normalizing images, the method comprising:
receiving a selection of a first image captured by a first camera device in a first environment to compare;
identifying a first set of properties of the first image, wherein a first property of the first set of properties is associated with the first camera device, and wherein a second property of the first set of properties is associated with the first environment;
receiving a selection of a second image captured by a second camera device in a second environment to compare to the first image;
identifying a second set of properties of the second image, wherein a first property of the second set of properties is associated with the second camera device, and wherein a second property of the second set of properties is associated with the second environment, and wherein the second environment is different from the first environment;
identifying at least one property of the second set of properties of the second image that differs from a corresponding property of the first image; and
automatically normalizing the second image so that the at least one property of the second image matches the corresponding property of the first image, wherein the second image is normalized using a conversion table comprising properties of the first camera device, the second camera device, the first environment, and the second environment.

9. The computerized method of claim 8, wherein the at least one property of the second image that differs from the corresponding property of the first image is a lighting property.

10. The computerized method of claim 9, further comprising normalizing the second image by adjusting a brightness of the second image.

11. The computerized method of claim 8, wherein the first property of the first image includes the first camera device that captured the first image and camera settings of the first camera device while capturing the first image.

12. The computerized method of claim 11, wherein the second property of the first image includes a lighting descriptor of the first environment where the first image was captured.

13. The computerized method of claim 11, wherein the first property of the second image includes the second camera device that captured the second image, camera settings of the second camera device while capturing the second image, and the second property of the second image includes a lighting descriptor of the second environment where the second image was captured.

* * * * *

UNITED STATES PATENT AND TRADEMARK OFFICE
CERTIFICATE OF CORRECTION

PATENT NO. : 10,212,359 B2
APPLICATION NO. : 14/984200
DATED : February 19, 2019
INVENTOR(S) : Robert A. Neff et al.

It is certified that error appears in the above-identified patent and that said Letters Patent is hereby corrected as shown below:

In the Drawings

Fig. 4 of 4, reference numeral 640: delete "OFTHE" and replace with --OF THE--.

In the Specification

Column 3, Line 46: delete "Electronic" and replace with --Electronics--.

Signed and Sealed this
Second Day of April, 2019

Andrei Iancu
*Director of the United States Patent and Trademark Office*